(12) United States Patent
Swale (10) Patent No.: US 6,504,923 B1
(45) Date of Patent: Jan. 7, 2003

(54) INTELLIGENT NETWORK WITH DISTRIBUTED SERVICE CONTROL FUNCTION

(75) Inventor: Richard P Swale, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,933

(22) PCT Filed: Jan. 2, 1998

(86) PCT No.: PCT/GB98/00003

§ 371 (c)(1),
(2), (4) Date: Mar. 10, 1998

(87) PCT Pub. No.: WO98/32291

PCT Pub. Date: Jul. 23, 1998

(30) Foreign Application Priority Data

Jan. 15, 1997 (GB) ............................................. 9700748
Feb. 3, 1997 (GB) ............................................. 9702461

(51) Int. Cl.[7] .................................................. H04M 1/00
(52) U.S. Cl. ........................... 379/221.09; 379/221.08; 379/221.1; 379/221.12
(58) Field of Search .................................. 370/428, 309, 370/244, 250; 709/223, 224, 232, 238; 379/207, 209.01, 221.09, 221.08, 221.1, 221.12, 221.14, 221.15, 265.02

(56) References Cited

U.S. PATENT DOCUMENTS

| | | | | |
|---|---|---|---|---|
| 5,084,816 A | * | 1/1992 | Boese et al. ..................... | 714/4 |
| 5,438,568 A | * | 8/1995 | Weisser, Jr. .................. | 370/389 |
| 5,479,495 A | * | 12/1995 | Blumhardt ............. | 379/209.01 |
| 5,533,106 A | * | 7/1996 | Blumhardt ............. | 379/142.02 |
| 5,553,130 A | * | 9/1996 | Turner .................... | 379/221.08 |
| 5,570,420 A | * | 10/1996 | Bress et al. ............. | 379/221.08 |
| 5,659,542 A | * | 8/1997 | Bell et al. .................... | 370/496 |
| 5,896,441 A | * | 4/1999 | Akazawa et al. .............. | 379/9 |
| 6,137,806 A | * | 10/2000 | Martinez .................... | 370/428 |
| 6,243,580 B1 | * | 1/2001 | Garner ........................ | 455/428 |

OTHER PUBLICATIONS

Feldman: "Intelligent Network System Architiecture" Annual Review of Communications, 1996, pp. 879–885.*
Hirano Et Al.: "Distributed Control Node Architecture in the Advanced Intelligent Network" XV International Switching Symposium, vol. 2, Apr. 23–28, 1995, Berlin DE, pp. 278–282.*
Nakamura Et Al.: "SCP Architecture with Performance Flexibility" IEEE Golbal Telecommunications Conference, vol. 3, Dec. 2, 1991, Pheonix US, pp. 1680–1684.*

* cited by examiner

Primary Examiner—Mehmet B. Geckil
Assistant Examiner—Paul H Kang
(74) Attorney, Agent, or Firm—Nixon & Vanderhye P.C.

(57) ABSTRACT

An intelligent network in which the service switching points (SSPs) consult a lookup table for services which require the use of a service control point (SCP), and send respective request messages containing a service type field. If such a service is one which can be handled by an SCP whose LAN (for the intercommunication of its various data processors) has become partitioned because of, say, a LAN fault, the SSP writes a first value for service type into the field, and if the service is one which must not be handled by a partitioned SCP, the SSP writes a second value. The request messages are sent via service transfer points (STPs). The network includes a transmission controller which has first and second states. Any SCP which detects that its LAN has become partitioned commands the transmission controller to enter the second state. In the first state the transmission controller is transparent to all messages regardless of the contents of the service type field, but in the second state it does not pass requests of the second service type. In one embodiment, each STP is integrally constructed with a respective transmission controller. In another embodiment, each SCP includes one or more respective transmission controller disposed at the junction of its signalling servers and the signalling link from the STP.

36 Claims, 8 Drawing Sheets

LOOKUP TABLE

| SERVICE | SERVICE TYPE |
|---|---|
| NUMBER TRANSLATION | ONE |
| CALLING CARD | TWO |
|  |  |
|  |  |

INTELLIGENT NETWORK WITH DISTRIBUTED SERVICE CONTROL FUNCTION

BACKGROUND OF THE INVENTION

1. Field of the Invention

This invention relates to intelligent communications networks, commonly called intelligent networks (INs), and particularly, but not exclusively, to service control points for use in INs.

2. Description of the Related Art

IN techniques have been understood for sometime to offer a flexible and possibly more cost effective route to the development and deployment of advanced telecommunications call handling services than traditional methods. Essentially, IN techniques effectively consist of the separation of call processing functions within a telephone exchange, or equivalent entity, from the service logic which provides the actual telecommunications service—such as "Freefone" type services typified by the 0800 numbering range in the United Kingdom.

Standards have been developed by a number of organisations which embody the concepts of IN techniques and identify a number of key functional components. Many of these components are identified in FIG. 1 of the drawings which is a schematic diagram of the structure of a known IN. In this structure, the service logic for the IN is embodied in computer programs executing on either a service control point (SCP), or an adjunct processor (not shown).

The present invention is concerned with the design and organisation of the computing resources realising the SCP or adjunct processor elements of an IN. With early implementations of IN systems, the computing resources realising the structure, i.e. the platform, of the SCP or adjunct processor elements of INs were provided by largely proprietary computing platforms—many of which were little more than subsections of the control processor from an existing telephone exchange design. These early implementations were complemented by second generation platforms which used commercially available computer systems (also referred to as data processors)—thereby reducing the cost of the platform. However the stringent requirements placed on these systems for continuous service availability and reliability to match those expected of a modern communications network tended to result in the use of fault tolerant, all be it commercial, computer systems.

In either case, the practice has been to deploy systems as mated pairs to minimise the risk of total service outage. This has led to the identification of an inherent weakness in these platforms since there is the need to maintain service data in synchronisation across all deployed computer systems. Whilst this is not a problem that is unique to the telecommunications industry, what makes the problem more complex is the requirement to achieve synchronisation within short timescales so as to minimise the effects of data synchronisation on service operation.

The above developments and requirements have logically led to the investigation of distributed processing techniques for solutions to the problems of scaling, application and data reuse and also platform reliability and integrity. Initiatives such as the Telecommunications Information Networking Architecture Consortium (TINA-C) dealing with distributed processing environment have striven to bring many of these issues to a conclusion over recent years.

The concept behind using distributed processing techniques in the realisation of IN service control points is the aim of achieving the desired availability, reliability and reuse through the software based redundancy afforded by distributed systems. This allows components of an application to be broken into self contained entities (e.g. clients or requesters of a function and servers or implementations of a function) which can realise applications which are highly resilient to failure due to the ability of a failed component to be dynamically replaced at run-time by simply selecting an alternative "server" element. An example architecture of this is shown in FIG. 2 of the drawings which is a schematic diagram of the structure or architecture of a service control point of the network of FIG. 1.

Figure 1:
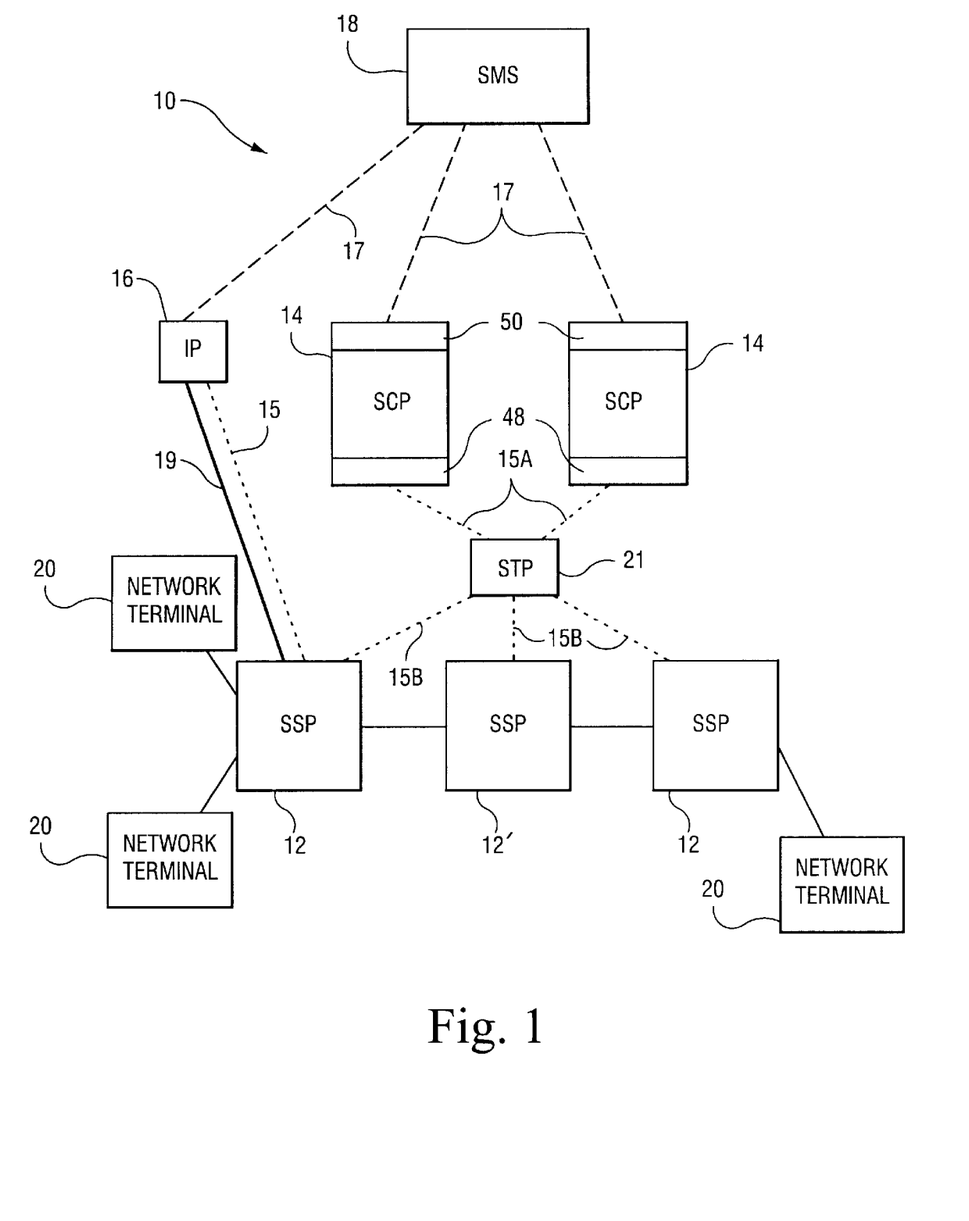
FIG. 1 is a schematic diagram of the structure of a known intelligent network.
Figure 2:
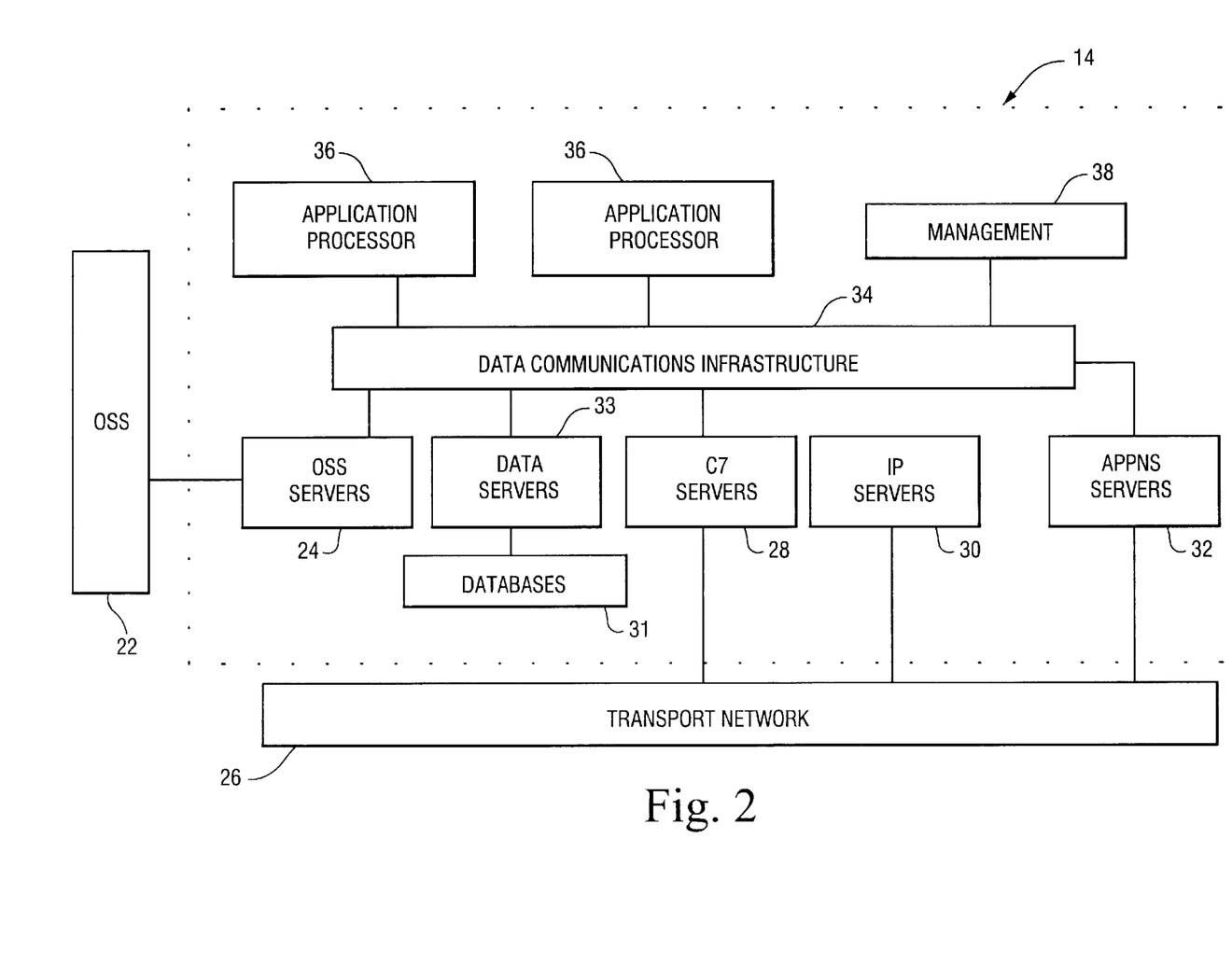
FIG. 2 is a schematic diagram of the structure of a service control point of the network of FIG. 1.

FIGS. 1 and 2 are described in detail later, but a sufficient understanding of the background of the present invention can be had with reference to only certain components of the intelligent network as follows.

An operations and support systems (OSS) domain which realises external operations and support systems, including customer handling etc.

A transport network domain which realises the telecommunications networks controlled from the platform.

A distributed service control point platform which realises the functionality delivering advanced telecommunications call handling services, such as "Freefone", cashless services (Calling Card etc.).

The SCP connects to the controlled telecommunications networks via an appropriate signalling means. For the public switched telecommunications network (PSTN), this is currently via a modification of ITU-T (formerly known as CCITT) No.7 signalling system (referred to as SS7) using the Intelligent Network Application Protocol. SS7 is a general purpose protocol and may be replaced by a special purpose protocol in the future, but this is not a significant matter for the purposes of the present invention.

SS7 signalling messages flow from a controlled switch of the PSTN, referred to as a service switching point (SSP), to a signalling termination which forms part of the SCP. In practice, the signalling between an individual SSP and the SCP passes via one or more intermediate signalling transfer points (STPs), also known as signalling point relays which enable the messages to be rerouted in the event of a failure in the signalling network—either within the transmission circuits used or the terminating equipment.

The SCP comprises a number of physical and logical functions required to deliver, manage and enable services to be realised. These functions include:

applications servers which provide the physical and logical functions realising the service logic;

a network control signalling interface server, for example a SS7 server, which translates network signalling protocols into an application orientated protocol for use within the rest of the platform;

an intelligent peripheral (IP) capability to provide the various special functions required within services, such as voice announcements, voice messaging and other such special resources;

a data server capability to provide a managed data repository for all customer, service and management data associated with the platform;

an OSS server to manipulate management data originating on the platform into a form suitable for the external OSS systems and vice-versa, thereby hiding the inherently distributed nature of the platform and simplifying external OSS;

management systems for providing internal management of the platform;

other servers, as may be required, to provide new functions, interwork with other telecommunications service providers etc;

a collection of various physical computer systems interconnected via appropriate datacommunications services (e.g. a transmission control protocol/Internet protocol (TCP/IP) data communications network, for example, a local area network and/or wide area network); and a set of software mechanisms realising a distributed processing environment which enable executing computer programs to interact via the datacommunications services in a manner which is largely hidden from the application programmer, such as products conforming to the documentation produced by the Object Management Group (OMG) such as the Common Object Request Broker Architecture (CORBA).

Whilst the aims of adopting a distributed processing based solution are noble in themselves there are a large number of difficulties and implications in working out real solutions in practice. One of these issues relates to the implementation of the network control signalling interface server and how this connects to the controlled transport networks. This is driven by three main design issues:

the need for multiple signalling channels to achieve the concurrency desired (number of simultaneous call in progress);

the need for sufficient bandwidth in the signalling channels to achieve the desired signalling message latency (which relates to the post dialling delay perceived by users); and the need for multiple signalling link server systems to achieve resilience to failure.

These factors in turn determine the number of physical signalling channels required and hence signalling circuit interfaces, which in turn is related to the number of separate physical computers required since a given computer is limited in the number of peripherals that it can support.

For an SCP platform of the dimensions required to deliver mass market services on the PSTN, the number of physical computer systems required can exceed 300 physical machines. As these machines need to interact with a set of application processors there is, therefore, the need to provide some form of data communications network (generally a TCP/IP network) to interconnect these computer systems to enable access to the common application processors and other resources.

The data communications network can be realised as an extended LAN, i.e. one which uses WAN elements to connect individual LANs, or by using a single LAN architecture depending on the number of computer systems required and the technology choice for the data network. In either case, any failure in part of the network (LAN and/or WAN) can result in a computer or group of computers becoming isolated from the rest of the computers in the system—this is referred to as network partitioning.

The article "Distributed Control Node Architecture in the Advanced Intelligent Network" by Masanori Hirano, Yasuo Kinouchi and Takashi Suzuki, 15th International Switching Symposium, 1995, discusses design issues of an IN service control function having a distributed configuration, and distributed databases from the viewpoint of cost to performance ratio, and reliability with regard to user data integrity. A service control point is described having a number of interconnected functions, where the functions are implemented by pluralities of respective modules, e.g. service control modules and service data modules.

The article "Intelligent Network System Architecture" by Samuel M. Feldman, Annual Review of Communications, 1996, discloses the use of active redundancy and cluster computer systems in the design of intelligent network elements for ensuring dependable service. A high-capacity cluster-based service control point is described having multiple front-end processors optimised for message transport and routing, and multiple back-end processors optimised for running applications.

BRIEF SUMMARY OF THE INVENTION

According to a first aspect of the present invention there is provided an intelligent communications network having a service switching function (SSF) comprising a plurality of service switching points (SSPs), a service control function (SCF) comprising a plurality of service control points (SCPs), and a signalling transfer function (STF) comprising at least one signalling transfer point (STP) and respective signalling links, in which network:

each SCP comprises,
  signalling receiving means,
  a distributed processing architecture comprising a plurality of data processors each connected to a data communications network arranged such that each data processor can communicate with each other processor, and
  a network state detector means arranged to detect that the data communications network is in a partitioned state and thus unable to provide communication from each data processor to each other data processor, and in response to output a predetermined command;

each SSP
  (a) has a stored list of services which require the use of the SCF, each service being associated with a respective preassigned service type, this being either a first service type indicative of services that may be processed by a partitioned SCP or a second service type indicative of services that must not be processed by a partitioned SCP, and
  (b) is arranged to respond to each call which relates to a service requiring the use of the SCF, by obtaining from the stored list its associated preassigned service type, and by sending to the SCF via the STF a message signal having a service type field into which the SSP has written the obtained service type; and there is provided message signal control means disposed between the signalling receiving means of the SCPs and the SSF and arranged to respond to receipt of said predetermined command from the network state detector means by changing from a first state, in which it permits transmission of all message signals, to a second state, in which it blocks transmission of all message signals whose service type field contains said second service type.

With an intelligent network of the present invention, messages from the transport network requesting services which require a common view of some service data (e.g. call queuing) can be rejected so as to avoid such a service either failing or functioning erroneously.

In INs wherein said signalling receiving means of each SCP comprises a respective plurality of signalling servers, preferably said message signal control means comprises a respective transmission controller for each signalling server.

In INs wherein said signalling receiving means of each SCP comprises a respective plurality of signalling servers and at least one signalling server is connected to a plurality of STPs, preferably said message signal control means comprises a respective transmission controller for each of said plurality of STPs.

Preferably, each transmission controller is disposed at the junction of the SCF and the STF.

Alternatively to said transmission controller being associated with the SCF, said message signal control means may comprise a respective transmission controller disposed integrally with the or each STP.

As the SCP does not switch isolated segments of the platform off, but merely controls the message signal control means, this avoids calls, which are not dependent upon a global view of service data within the service platform and could otherwise have been processed effectively, from being rejected due to unavailability of resources, and reduces the likelihood of further failures resulting from a rippling of processing load around the remaining functional elements of the IN.

According to a second aspect of the present invention there is provided a service control point (SCP) for use in an intelligent communications network, the SCP comprising a distributed processing architecture comprising a plurality of data processors each connected to a data communications network arranged such that each data processor can communicate with each other processor, and a network state detector means arranged to detect that the data communications network is in a partitioned state and thus unable to provide communication from each data processor to each other data processor, and in response to output a predetermined command.

Preferably, the network state detector means is distributed and comprises respective first detector means in each data processor, each respective first detector means being arranged in accordance with a first predetermined algorithm to detect that the data communications network has become partitioned by analysis of interprocessor messages received by its associated data processor.

Alternatively, the data communications network comprises a plurality of interconnected nodes, each node being connected to a respective plurality of the data processors, and the network state detector means is constituted by a respective one of the data processors at each of the nodes, said respective data processor being arranged to monitor interprocessor messages handled by its associated node and to detect, in accordance with a first predetermined algorithm, that the data communications network has become partitioned by analysis of said monitored interprocessor messages.

In a further alternative, the network state detector means is constituted by one of the data processors arranged to monitor interprocessor messages handled by the data communications network and to detect, in accordance with a first predetermined algorithm, that the data communications network has become partitioned by analysis of said monitored interprocessor messages.

Preferably, each data processor is arranged to transmit on the data communications network a respective predetermined message at predetermined times in accordance with a second predetermined algorithm, and the network state detector means is arranged to receive said predetermined messages transmitted on the data communications network and in accordance with said second predetermined algorithm to send said predetermined command upon detection of a lack of reception of a said predetermined message.

More preferably, the network state detector means is arranged in accordance with said second predetermined algorithm to treat the transmission of an interprocessor message by a said data processor as equivalent to the transmission of a said predetermined message by the said data processor, and to transmit a said predetermined message in the event that a predetermined length of time has elapsed since the said data processor has transmitted a message of any type.

Alternatively, each data processor is arranged, in the event that it transmits an interprocessor message at substantially the same time as the due time for transmission of a said predetermined message, to delay transmission of said predetermined message until after the end of said interprocessor message.

When the network state detector means is distributed and comprises respective first detector means in each data processor, as mentioned above, the network state detector means may further comprise, associated with each data processor, a respective second detector means for detecting a said lack of reception of a said predetermined message.

When the data communications network comprises a plurality of interconnected nodes, each node being connected to a respective plurality of the data processors, and the network state detector means is constituted by a respective one of the data processors at each of the nodes, as mentioned above, preferably each said respective one of the data processors at each of the nodes constitutes a manager for the data processors associated with its respective node and comprises a respective second detector means for detecting a said lack of reception of a said predetermined message.

According to a third aspect of the present invention there is provided a service switching point (SSP) for use in an intelligent communications network comprising a service control function (SCF) comprising a plurality of service control points (SCPs), the SSP comprising a stored list of services which require the use of the SCF, each service being associated with a respective preassigned service type, this being either a first service type indicative of services that may be processed by a partitioned SCP or a second service type indicative of services that must not be processed by a partitioned SCP, and being arranged to respond to each call which relates to a service requiring the use of the SCF, by obtaining from the stored list its associated preassigned service type, and by outputting a message having a service type field into which the SSP has written the obtained service type.

According to a fourth aspect of the present invention there is provided a signalling transfer point (STP) for use in an intelligent communications network comprising a plurality of service switching points (SSPs), and a service control function (SCF); the STP being integral with message signal control means arranged to respond to receipt of a predetermined command from the SCF by changing from a first state, in which transmission of all message signals is permitted, to a second state, in which transmission of message signals whose service type field contains said second service type is not permitted.

According to a fifth aspect of the present invention there is provided a method of operating an intelligent communications network which comprises a plurality of service switching points (SSPs), a service control function (SCF) comprising a plurality of service control points (SCPs), and a signalling transfer function (STF) comprising at least one signalling transfer point (STP), in which network each SCP comprises a distributed processing architecture comprising a plurality of data processors each connected to a data communications network arranged such that each data processor can communicate with each other processor, the method comprising the steps of:

(a) storing in each SSP a list of services which require the use of the SCF, each service being stored in association with a respective preassigned service type, this being either a first service type indicative of services that may be processed by a partitioned SCP or a second service type indicative of services that must not be processed by a partitioned SCP;

(b) detecting that the data communications network is in a partitioned state and thus unable to provide communication from each data processor to each other data processor, and in response outputting a predetermined command;

(c) receiving said predetermined command at message signal control means and in response changing from a first state, in which it permits transmission of all message signals, to a second state, in which it blocks transmission of all message signals whose service type field contains said second service type; and responding at the SSPs to each call which relates to a service requiring the use of the SCF, by obtaining from the stored list its associated preassigned service type, and by sending to the SCF via the STF a message having a service type field into which the SSP has written the obtained service type.

BRIEF DESCRIPTION OF THE DRAWINGS

Specific embodiment of the present invention will now be described by way of example with reference to the drawings in which.

DESCRIPTION OF THE INVENTION

In FIG. 1, there is shown an intelligent network (IN) 10 of known structure comprising a service switching function (SSF) comprising a plurality of service switching points (SSPs) 12, a service control function (SCF) comprising a plurality of service control points (SCPs) 14, a plurality of intelligent peripherals (IPs) 16, only one of which is shown, a service management system (SMS) 18, and a signalling transfer function (STF) comprising a plurality of signalling transfer points (STPs) 21 (see also STPs 40 in FIG. 3), only one of which is shown. As is known, some of the SSPs 12 act as local exchanges and are connected to a plurality of network terminals 20 via a local access network, not shown, and some of the SSPs 12', only one of which is shown, act as trunk exchanges.

For information on intelligent networks in general the reader is referred to BT Technology Journal Vol.13 No.2 April 1995, the theme of which is network intelligence.

Each SCP 14 has an interface 50 through which it is coupled to an STP 21 via a respective network signalling link 15A shown in dotted line, and each STP 21 is coupled to a respective plurality of SSPs 12 via respective network signalling links 15B shown in dotted line. Each SCP 14 also has an interface 48 through which it is also coupled to the SMS 18 via an operational command link 17 shown in dashed line. Each IP 16 is coupled to the SMS 18 via an operational command link 17, and to a respective one of the SSPs 12 via a network signalling link 15, and a traffic data link 19 shown in continuous thick line.

In FIG. 2, there is shown the software architecture of an SCP 14, which is based on a distributed processing environment using object oriented, multi-threaded processing software techniques. It will thus be understood that an individual object can support multiple threads of control and multiple messaging sessions with many other objects simultaneously.

The SCP 14 is coupled to an external operations and support systems domain (OSS) 22, providing customer handling, via a plurality of OSS servers 24, and to an external transport network domain (TN) 26, i.e. the telecommunications networks controlled from the SCP 14, via a plurality of signalling interface servers (referred to as SS7 servers) 28 arranged to handle signalling messages conforming to the international signalling system known as ITU-T common channel signalling system No.7. The SCP 14 is also coupled to the TN 26 via a plurality of IP servers 30, and a plurality of applications servers 32.

The distributed processing environment of the SCP 14 comprises a plurality of databases 31, and a plurality of database servers 33 (also known as data servers), each server 33 being coupled to a respective plurality of the databases 33, and further comprises a data communications infrastructure (DCI) or network 34 coupled to the servers 24, 28, 30, 32 and 33, to a plurality of application processors (APs) 36 and to an SCP management system (MS) 38, and is realised by a set of software mechanisms (objects) conforming to the specification of an architecture known as common object request broker architecture (CORBA). This structure of the SCP 14 is well known in the art of intelligent networks.

Figure 3:
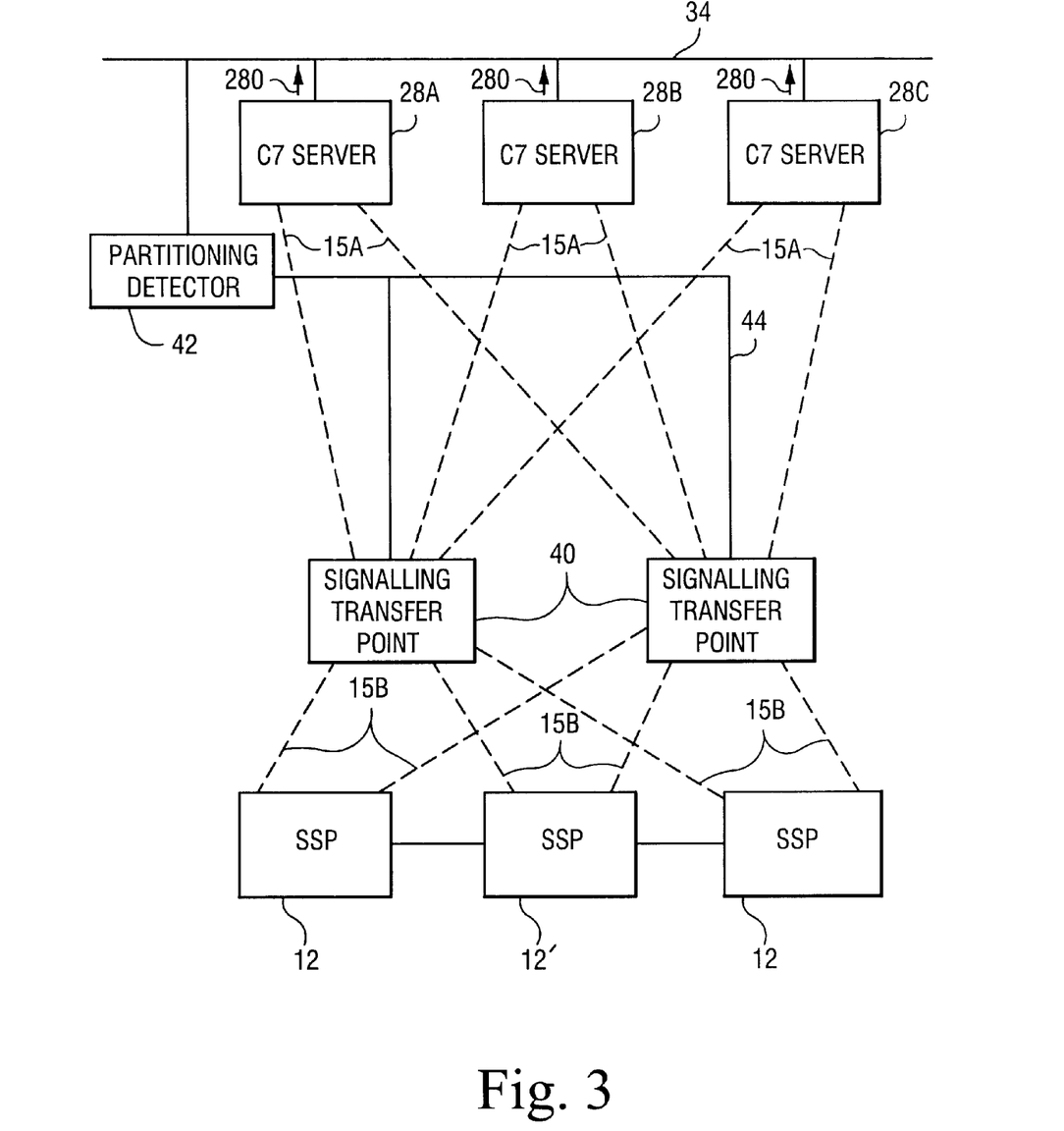
FIG. 3 is a schematic diagram of part of the structure of the service control point of FIG. 2 modified in accordance with a first aspect of the present invention.

FIG. 3 shows three SS7 servers 28A, 28B and 28C of an SCP 14, each SS7 server 28 being connected to the DCI 34 which is in the form of a LAN. As mentioned, the SCP 14 is not connected directly to SSPs 12 by network signalling links 15 but via respective network signalling links 15A to the two STPs 40 shown in FIG. 3. Each STP 40 is connected to each of the SSPs 12 via respective network signalling links 15B.

The SCP 14 also comprises, in accordance with the present invention, a partitioning detector 42 (constituting a network state detector means of the present invention) which has an input connected to the DCI 34, and an output connected via a link 44 to the two STPs 40.

Each of the SS7 servers 28 is arranged to transmit onto the DCI 34 a heartbeat message (containing the predetermined message of the present invention and illustrated as an arrow 280 in FIG. 3) at a predetermined repetition rate (constituting the second predetermined algorithm of the present invention), e.g. every fifteen seconds. The heartbeat message comprises the respective LAN address of the transmitting SS7 server and a byte signifying that the message is a heartbeat message. The partitioning detector 42 listens out for heartbeat messages on the DCI 34 and provided that it receives all the expected heartbeat messages, it periodically send a first command message to the STPs 40 to command them to reset to a first state in which they treat incoming signalling messages from the SSPs 12 non-discriminately. The STPs 40 may already be in this first as part of network initialisation.

If the partitioning detector 42 detects that an expected heartbeat message was not received, i.e. detects the lack of reception of the heartbeat message, it sends a second command message to the STPs 40 to command them to enter a second state in which they filter incoming signalling messages from the SSPs 12, and to inform them of the identity of its SCP 14. In this embodiment, each STP 40 includes as an integral part of its construction a message signal control means of the present invention.

Figure 6:
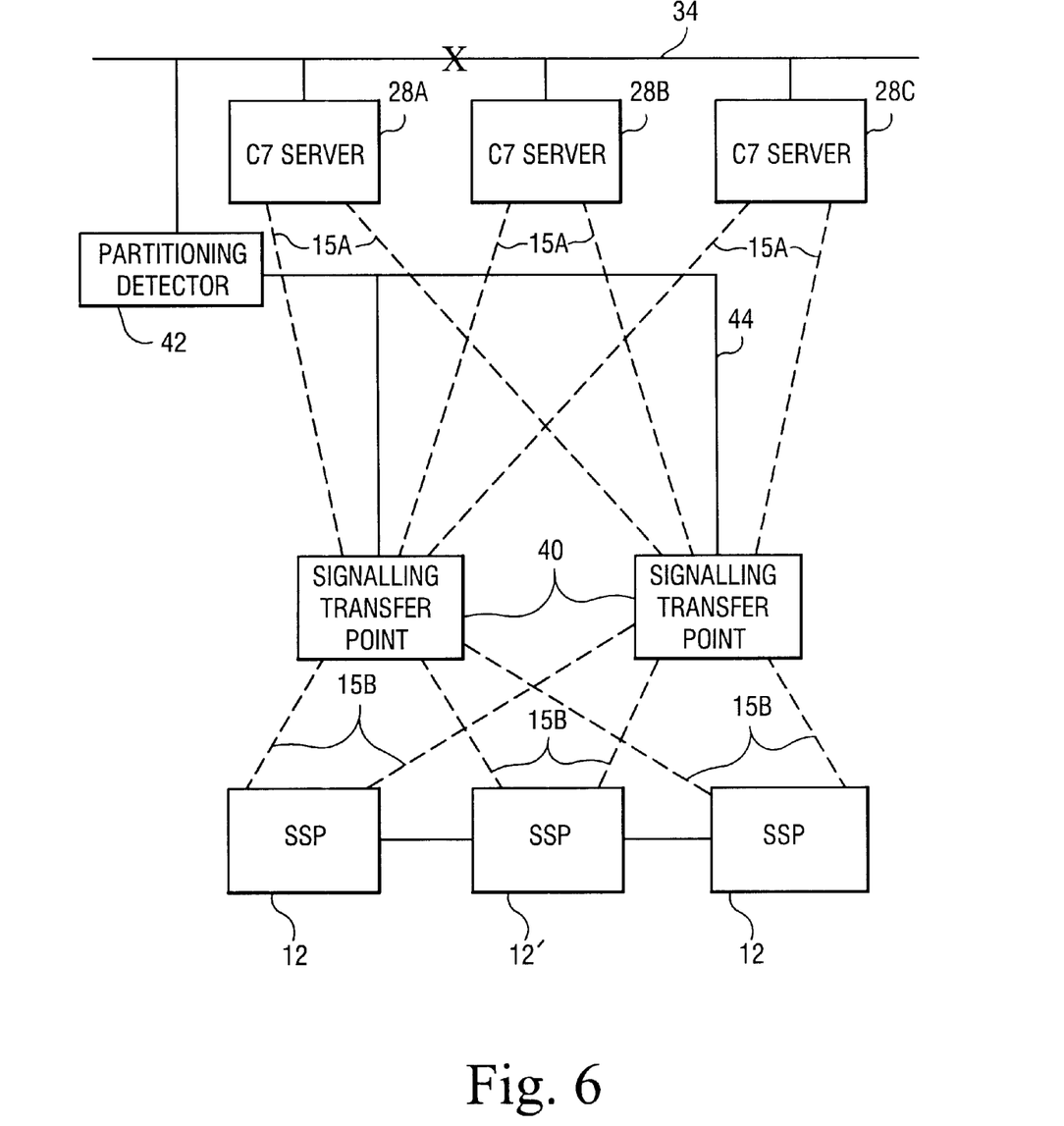
FIG. 6 is a schematic diagram of FIG. 2 including an indication of a break in the distributed communications infrastructure.

In a variant, the partitioning detector 42 informs the STPs 40 as to the identity of the SS7 servers 28 in the separate partitions, for example, server 28A in one partition, and servers 28B and 28C in another partition (for a break in the DCI 34 between servers 28A and 28B as indicated by the "x" in FIG. 6). An SCP 14 that has such a partitioned DCI 34 is referred to herein as a partitioned SCP.

The operation of the STPs 40 will now be described with reference to two examples of service requests from an SSP, and assuming that for both examples the STPs are in their second state as the result of the partitioning detector 42 responding to lack of reception of a heartbeat from a SS7 server.

In the first example, a user has dialled an 0800 number, for example 0800 120000, and the user's local exchange SSP 12 sends a signalling message for number translation service. This service is an example of a first type of service, referred to as type one, which can be invoked on any SCP regardless of whether it is a partitioned SCP. Such services are hard-coded as self sufficient executable computer programs.

Figure 7:
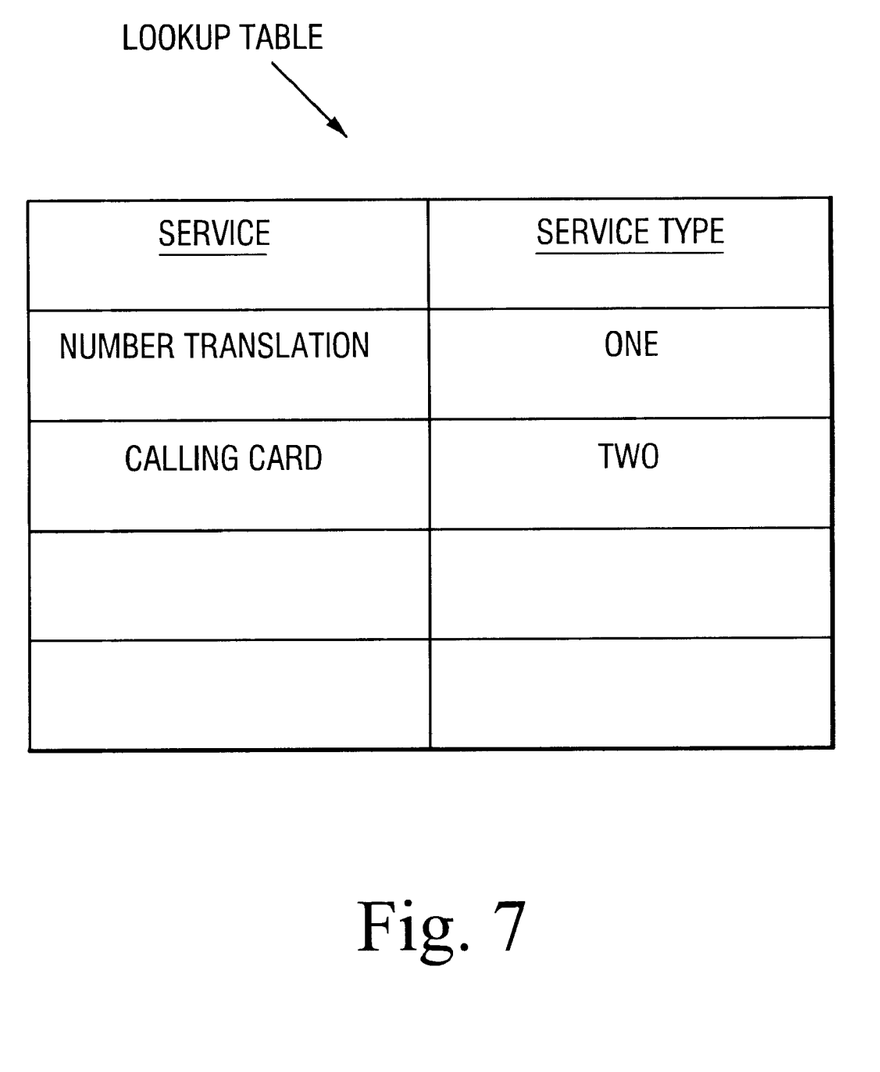
FIG. 7 shows a lookup table of a service switching point of the present invention.
Figure 8:
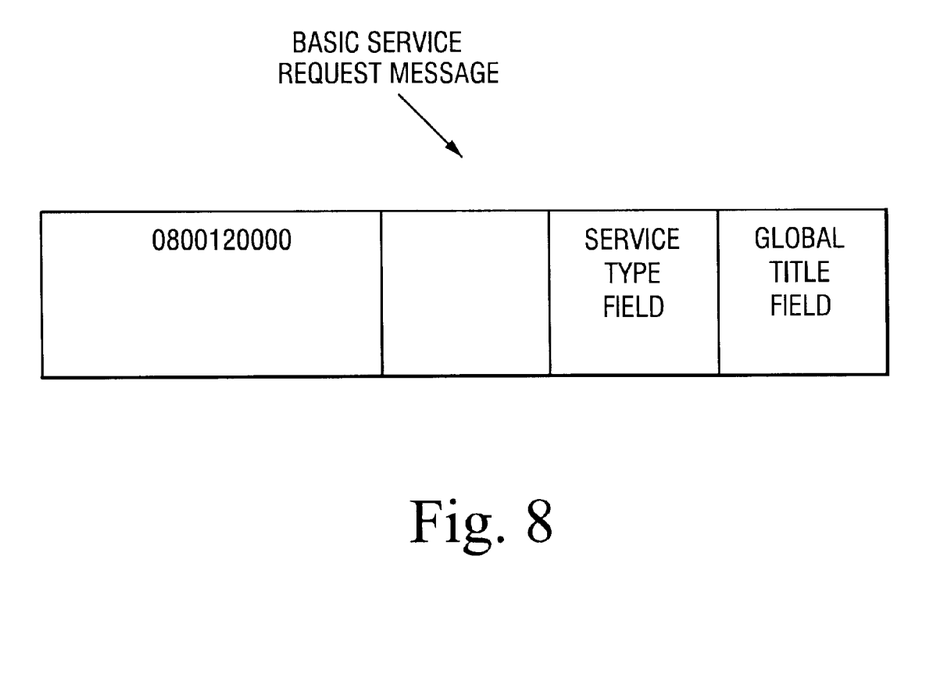
FIG. 8 is a schematic diagram of a basic service request message generated by a service switching point of the present invention.

The SSP 12 construts a basic service request message (see FIG. 8) containing 0800 120000 and addresses the message to an SCP by inserting the global title for the service control function into a signalling connection control part (SCCP) of the intelligent network application protocol (INAP) used for communication between the components of the IN 10. The SSP 12, in accordance with its operating program, accesses a lookup table (see FIG. 7) with the specific service to obtain its associated service type. The lookup table lists each service together with its associated service type, either type one or type two (and thus constitutes a stored list of the present invention). Having obtained the service type (type one) from the lookup table, the SSP 12 now checks, and changes if necessary, the value of a "service type" flag in the SCCP. A flag value of one corresponds to type one, and a flag value of zero corresponds to type two. In variants, this flag is constituted by the global title field of the SCCP message, and the two values of the "flag" are the titles "Partition Sensitive SCP Service" and "Non-Partition sensitive SCP Service".

Figure 5:
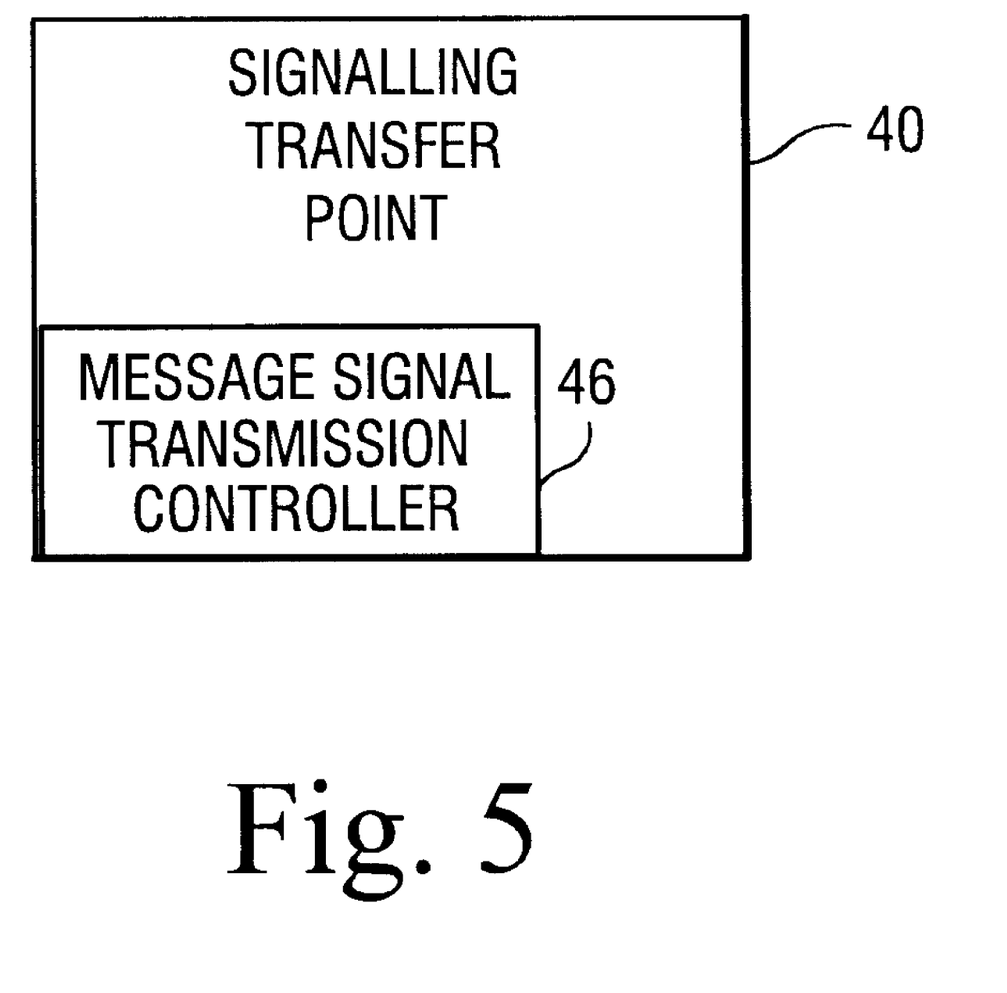
FIG. 5 is a schematic diagram of a signalling transfer point having an integral transmission controller.

When the message has been constructed, the SSP 12 encloses the message in a header and tailer of a transmission protocol used for transmission between the SSP 12 and the STPs 40, i.e. the message transfer part (MTP) of INAP, and send the resulting message to an 40. On receiving this message, the STP 40 strips off the header and tailer, reads the global title and the flag in the SCCP and determines that it has to send the message to an SCP 14 and, using an integral message signal transmission controller (referenced as 46 in FIG. 5), determines that the messages relates to the first service type. The STP 40 then selects one of the SCPs to which it is connected, and sends the request message, enclosed in a new header and tailer, to the selected SCP 14. The STP 40 knows the sub-system numbers of all the SCPs 14 that it is connected to, and also the individual addresses of the SS7 severs 28(A, B, C,) within the selected SCP 14, and for a message relating to this first service type makes no distinction between the SS7 servers 28A, 28B and 28C, but selects which of the three to send the message to on a "round robin" basis.

The STP 40 acts only as a message relay and does not perform any processing of the content of the transaction capabilities application part (TCAP) of the message, where the service data is carried in respective fields. Without the flag in the SCCP, or an equivalent method of distinguishing two forms of global title for a service control function, the simple relay form of an STP 40, i.e. an STP not having an integral transmission controller 46, would not be able to distinguish the two types of service and the STPs would have to be specially redesigned to analyse the contents of the TCAP. However, such a redesign is not preferred because of the ensuing reduction in message handling capacity.

In the second example, the user has dialled the access number for "Chargecard" (or Calling Card) service (in the United Kingdom this number is 144). "Chargecard" service is an example of a service which involves calls to be queued. Such calls require data to survive the processing time of an individual call and also require the status of the queue to be accessible beyond the context of a single processing thread. This service is an example of a second type of service which can be invoked only on an SCP whose DCI 34 is not partitioned.

On receipt of the dialled digits, the local exchange SSP 12 constructs a basic service request message (TCAP) containing the service details, and an SCCP containing the global title for the service control function, and ensures that the service type flag has the value zero.

The SSP 12 now encloses this message in a header and tailer of the transmission protocol, and sends the resulting message to an STP 40. On receiving this message, the STP 40 strips off the header and tailer, reads the destination address and determines that it has to send the message to an SCP 14 and that the message relates to the second service type. This time, the STP 40, in selecting one of the SCPs to which it is connected, ignores any SCP which it knows is a partitioned SCP, and sends the request message, enclosed in a new header and tailer, to the selected SCP 14.

In the variant mentioned above, the STP 40, under control of its transmission controller 46, is permitted to send a second type service message to a partitioned SCP, but it will ignore any SS7 server 28 which is isolated in a partition, e.g. the server 28A.

Whereas in the above embodiment the partitioning detector 42 is arranged to listen out for separate heartbeat messages, these may be incorporated into normal interprocessor messages, or may be omitted in favour of such normal interprocessor messages and the partitioning detector 42 arranged to infer the condition of the DCI 34 from the normal interprocessor messages. In this case, the SS7 servers 28 are arranged to retrigger a timeout for each normal interprocessor message that they send, and in this way a heartbeat message is sent only in the absence of normal interprocessor messages.

In another variant, the partitioning detector 42 is not a single entity but is distributed such that each data processor connected to the DCI 34 runs a respective partitioning detection program (constituting a second detector means of the present invention). In the same or another variant, instead of the partitioning detector 42 being arranged to send a command message directly to the STPs 40, that function is performed by the MS 38, which sends the message to the STPs 40 via the link 44.

The partitioning detector 42, or, as the case may be, the MS 38, sends a message to the OSS 22 to inform it that there is a DCI failure (partitioning) and identifying the data processors or groups of data processors affected by the failure.

In a variant, each data processor is arranged under the control of a program (this constituting first detector means of the present invention) to send a "partitioning detected" message directly or indirectly to the STPs 40 upon determining that there is an error in a received interprocessor message.

Figure 4:
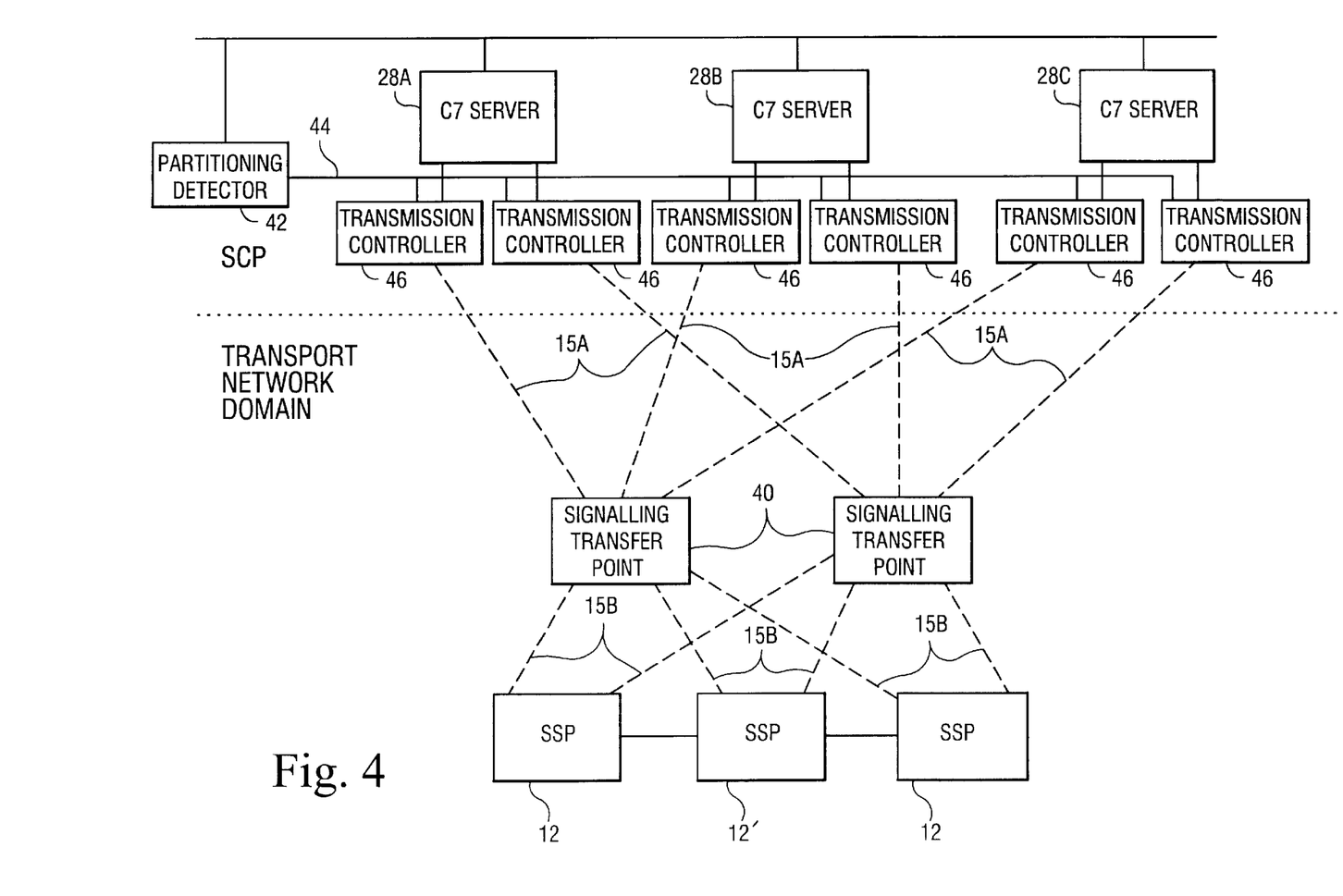
FIG. 4 is a schematic diagram of part of the structure of the service control point of FIG. 2 modified in accordance with a second aspect of the present invention

In the second embodiment, instead of each STP 40 having a respective message signal transmission controller as an integral part thereof, respective individual message signal transmission controllers 46 are disposed at the junction of the SCF and the STF, i.e. at the termination of each of the signalling links 15A, as is shown in FIG. 4, and each transmission controller 46 is connected to the partitioning detector 42 by the link 44 for receiving the command message. For ease of manufacture, these message signal transmission controllers 46 will be integral with the associated SCP, and in this respect can be thought of as being part of the SCP.

Although a separate transmission controller 46 is shown for each of the signalling links 15A, each SS7 server 28 may be associated with only a single respective transmission controller 46 which has a plurality of inputs for terminating a corresponding plurality of signalling links 15A.

The abovedescribed embodiments and variants enable service availability to be maintained for type one services and avoid the STPs considering an SCP as Out Of Service awaiting repair of its faulty DCI and thus not sending any messages to that SCP, even those which the faulty SCP could process.

What is claimed is:

1. An intelligent communications network having a service switching function (SSF) comprising a plurality of service switching points (SSPs), a service control function (SCF) comprising a plurality of service control points (SCPs), and a signalling transfer function (STF) comprising at least one signalling transfer point (STP) and respective signalling links, in which network:

each SCP comprises,
  signalling receiving means,
  a distributed processing architecture comprising a plurality of data processors each connected to a data communications network arranged such that each data processor can communicate with each other processor, and
  a network state detector means arranged to detect that the data communications network is in a partitioned state and thus unable to provide communication from each data processor to each other data processor, and in response to output a predetermined command;

each SSP
  (a) has a stored list of services which require the use of the SCF, each service being associated with a respective preassigned service type, this being either a first service type indicative of services that may be processed by a partitioned SCP or a second service type indicative of services that must not be processed by a partitioned SCP, and
  (b) is arranged to respond to each call which relates to a service requiring the use of the SCF, by obtaining from the stored list its associated preassigned service type, and by sending to the SCF via the STF a message signal having a service type field into which the SSP has written the obtained service type; and there is provided message signal control means disposed between the signalling receiving means of the SCPs and the SSF and arranged to respond to receipt of said predetermined command from the network state detector means by changing from a first state, in which it permits transmission of all message signals, to a second state, in which it blocks transmission of all message signals whose service type field contains said second service type.

2. An intelligent network as claimed in claim 1, wherein said signalling receiving means of each SCP comprises a respective plurality of signalling servers, and said message signal control means comprises a respective transmission controller for each signalling server.

3. An intelligent network as claimed in claim 1, wherein said signalling receiving means of each SCP comprises a respective plurality of signalling servers, at least one signalling server being connected to a plurality of STPs, and wherein said message signal control means comprises a respective transmission controller for each of said plurality of STPs.

4. An intelligent network as claimed in claim 2, wherein each transmission controller is disposed at the junction of the SCF and the STF.

5. An intelligent network as claimed in claim 1, wherein said message signal control means comprises a respective transmission controller disposed integrally with the or each STP.

6. An intelligent network as claimed in claim 1, wherein in each SCP, the respective network state detector means is distributed and comprises respective first detector means in each data processor, each respective first detector means being arranged in accordance with a first predetermined algorithm to detect that the data communications network has become partitioned by analysis of interprocessor messages received by its associated data processor.

7. An intelligent network as claimed in claim 1, wherein, in each SCP, the data communications network comprises a plurality of interconnected nodes, each node being connected to a respective plurality of the data processors, and the respective network state detector means is constituted by a respective one of the data processors at each of the nodes, said respective data processor being arranged to monitor interprocessor messages handled by its associated node and to detect, in accordance with a first predetermined algorithm, that the data communications network has become partitioned by analysis of said monitored interprocessor messages.

8. An intelligent network as claimed in claim 1, wherein, in each SCP, the respective network state detector means is constituted by one of the data processors arranged to monitor interprocessor messages handled by the data communications network and to detect, in accordance with a first predetermined algorithm, that the data communications network has become partitioned by analysis of said monitored interprocessor messages.

9. An intelligent network as claimed in claim 1, wherein, in each SCP, each data processor is arranged to transmit on the respective data communications network a respective predetermined message at predetermined times in accordance with a second predetermined algorithm, and the respective network state detector means is arranged to receive said predetermined messages transmitted on the respective data communications network and in accordance with said second predetermined algorithm to output said predetermined command upon detection of a lack of reception of a said predetermined message.

10. An intelligent network as claimed in claim 9, wherein, in each SCP, the respective network state detector means is arranged in accordance with said second predetermined algorithm to treat the transmission of an interprocessor message by a said data processor as equivalent to the transmission of a said predetermined message by the said data processor, and to transmit a said predetermined message in the event that a predetermined length of time has elapsed since the said data processor has transmitted a message of any type.

11. An intelligent network as claimed in claim 10, wherein, in each SCP, each data processor is arranged, in the event that it transmits an interprocessor message at substantially the same time as the due time for transmission of a said predetermined message, to delay transmission of said predetermined message until after the end of said interprocessor message.

12. An intelligent network as claimed in claim 6, wherein, in each SCP, each data processor is arranged to transmit on the respective data communications network a respective predetermined message at predetermined times in accordance with a predetermined algorithm, and the respective network state detector means is arranged to receive said predetermined messages transmitted on the respective data communications network and in accordance with said predetermined algorithm to output said predetermined command upon detection of a lack of reception of a said predetermined message;
in each SCP, the network state detector means further comprises, associated with each data processor, a respective second detector means for detecting a said lack of reception of a said predetermined message.

13. An intelligent network as claimed in claim 7, wherein, in each SCP, each data processor is arranged to transmit on the respective data communications network a respective predetermined message at predetermined times in accordance with a second predetermined algorithm, and the respective network state detector means is arranged to receive said predetermined messages transmitted on the respective data communications network and in accordance with said second predetermined algorithm to output said predetermined command upon detection of a lack of reception of a said predetermined message;
each said respective one of the data processors at each of the nodes constitutes a manager for the data processors associated with its respective node and comprises a respective second detector means for detecting a said lack of reception of a said predetermined message.

14. The network of claim 1, wherein the message signal control means changes from the first state, in which the message signal control means permits transmission of all message signals sent from the SSP to the SCF, to the second state, in which the message signal control means blocks transmission of all said message signals whose service type field contains said second service type.

15. A service control point (SCP) for use in an intelligent communications network, the SCP comprising
a distributed processing architecture comprising a plurality of signalling servers each connected to a data communications network arranged such that each signalling server can communicate with each other signalling server, and
a network state detector arranged to detect that the data communications network is in a partitioned state and thus unable to provide communication from each signalling server to each other signalling server, and in response to output a predetermined fault signal; and
message signal transmission controller for receiving message signals from a signal transfer point of the intelligent communications network and responsive to said predetermined fault signal to allow or deny transmission to the signalling servers in dependence upon whether the content of a service type field of a received message signal indicates a service that may be processed by a partitioned SCP or a service that must not be processed by a partitioned SCP.

16. An SCP as claimed in claim 15, wherein the network state detector is distributed and comprises a respective first detector in each signalling server, each respective first detector being arranged in accordance with a first predetermined algorithm to detect that the data communications network has become partitioned by analysis of interprocessor messages received by its associated signalling server.

17. An SCP as claimed in claim 15, wherein the data communications network comprises a plurality of interconnected nodes, each node being connected to a respective plurality of the signalling servers, and the network state detector is constituted by a respective one of the signalling servers at each of the nodes, said respective signalling servers being arranged to monitor interprocessor messages handled by its associated node and to detect, in accordance with a first predetermined algorithm, that the data communications network has become partitioned by analysis of said monitored interprocessor messages.

18. An SCP as claimed in claim 15, wherein the network state detector is constituted by one of the signalling servers arranged to monitor interprocessor messages handled by the data communications network and to detect, in accordance with the first predetermined algorithm, that the data communications network has become partitioned by analysis of said monitored interprocessor messages.

19. An SCP as claimed in claim 15, wherein each signalling server is arranged to transmit on the data communications network a respective predetermined message at predetermined times in accordance with a predetermined algorithm, and the network state detector is arranged to receive said predetermined messages transmitted on the data communications network and in accordance with said predetermined algorithm to send said predetermined fault signal upon detection of a lack of reception of a said predetermined message.

20. An SCP as claimed in claim 19, wherein the network state detector is arranged in accordance with said predetermined algorithm to treat the transmission of an interprocessor message by a said signalling server as equivalent to the transmission of a said predetermined message by said signalling server, and to transmit a said predetermined message in the event that a predetermined length of time has elapsed since the said signalling server has transmitted a message of any type.

21. An SCP as claimed in claim 19, wherein each signalling server is arranged, in the event that it transmits an interprocessor message at substantially the same time as the due time for transmission of a said predetermined message, to delay transmission of said predetermined message until after the end of said interprocesser message.

22. An SCP as claimed in claim 16, wherein each signalling server is arranged to transmit on the data communications network a respective predetermined message at predetermined times in accordance with a predetermined algorthim, and the network state detector is arranged to receive said predetermined messages transmitted on the data communications network and in accordance with said predetermined algorithm to send said predetermined fault signal upon detection of a lack of reception of a said predetermined message; and the network state detector further comprises, associated with each signalling server, a respective second detector for detecting a said lack of reception of a said predetermined message.

23. An SCP as claimed in claim 17, wherein each signalling server is arranged to transmit on the data communications network a respective predetermined message at predetermined times in accordance with a second predetermined algorithm, and the network state detector is arranged to receive said predetermined messages transmitted on the data communications network and in accordance with said second predetermined algorithm to send said predetermined fault signal upon detection of a lack of reception of a said predetermined message; and each said respective one of the signalling servers at each of the nodes constitutes a manager for the signalling servers associated with its respective node and comprises a respective second detector for detecting a said lack of reception of a said predetermined message.

24. A service control point (SCP) for use in an intelligent communications network, the SCP comprising:

a first interface for communication with a network center for processing fault signals;

a second interface for communication with a signalling transfer point (STP) of the intelligent network;

a distributed processing architecture including a plurality of signalling serves each connected to a data communications network arranged such that each signalling server can communicate with each other signalling server and;

a data communications network fault detector arranged to detect when each signalling server is not able to communicate with each other signalling server over the date communications network, and in response to provide to said second interface a fault signal for transmission to said STP.

25. An SCP as claimed in claim 24, wherein the network fault detector is distributed and comprises a respective first detector in each signalling server, each respective first detector being arranged in accordance with a first predetermined algorithm to detect that the data communication network has become partitioned by analysis of interprocessor messages received by its associated signalling server.

26. An SCP as claimed in claim 24, wherein the data communications network comprises a plurality of interconnected nodes, each node being connected to a respective plurality of the signalling servers, and the network fault detector is constituted by a respective one of the signalling servers at each of the nodes, said respective signalling servers being arranged to monitor interprocessor messages handled by its associated node and to detect, in accordance with a first predetermined algorithm, that the data communications network has become partitioned by analysis of said monitored interprocessor messages.

27. An SCP as claimed in claim 24, wherein the network fault detector is constituted by one of the signalling servers arranged to monitor interprocessor messages handled by the data communications network and to detect, in accordance with the first predetermined algorithm, that the data communications network has become partitioned by analysis of said monitored interprocessor messages.

28. An SCP as claimed in claim 24, wherein each signalling server is arranged to transmit on the data communications network a respective predetermined message at predetermined times in accordance with a predetermined algorithm, and the network fault detector is arranged to receive said predetermined messages transmitted on the data communications network and in accordance with said predetermined algorithm to send said fault signal upon detection of a lack of reception of a said predetermined message.

29. An SCP as claimed in claim 28, wherein the network fault detector is arranged in accordance with said predetermined algorithm to treat the transmission of an interprocessor message by a said signalling server as equivalent to the transmission of a said predetermined message by the said signalling server, and to transmit a said predetermined message in the event that a predetermined length of time has elapsed since the said signalling server has transmitted a message of any type.

30. An SCP as claimed in claim 28, wherein each signalling server is arranged, in the event that it transmits an interprocessor message at substantially the same time as the due time for transmission of a said predetermined message, to delay transmission of said predetermined message until after the end of said interprocessor message.

31. An SCP as claimed in claim 25, wherein each signalling server is arranged to transmit on the data communications network a respective predetermined message at predetermined times in accordance with a predetermined algorithm, and the network fault detector is arranged to receive said predetermined messages transmitted on the data communications network and in accordance with said predetermined algorithm to send said fault signal upon detection of a lack of reception of a said predetermined message; and the network fault detector further comprises, associated with each signalling server, a respective second detector for detecting a said lack of reception of a said predetermined message.

32. An SCP as claimed claim 26, wherein each signalling server is arranged to transmit on the data communications network a respective predetermined message at predetermined times in accordance with a second predetermined algorithm, and the network fault detector is arranged to receive said predetermined messages transmitted on the data communications network and in accordance with said second predetermined algorithm to send said fault signal upon detection of a lack of reception of a said predetermined message; and each said respective one of the signalling servers at each of the nodes constitutes a manager for the signalling server associated with its respective node and comprises a respective second detector for detecting a said lack of reception of a said predetermined message.

33. A method of operating an intelligent communications network which comprises a plurality of service switching points (SSPs), a service control function (SCF) comprising a plurality of service control points (SCPs), and a signalling transfer function (STF) comprising at least one signalling transfer point (STP), in which network each SCP comprises a distributed processing architecture comprising a plurality of data processors each connected to a data communications network arranged such that each data processor can communicate with each other processor, the method comprising the steps of:

(a) storing in each SSP a list of services which require the use of the SCF, each service being stored in association with a respective preassigned service type, this being either a first service type indicative of services that may be processed by a partitioned SCP or a second service type indicative of services that must not be processed by a partitioned SCP;

(b) detecting that the data communications network is in a partitioned state and thus unable to provide communication from each data processor to each other data processor, and in response outputting a predetermined command;

(c) receiving said predetermined command at message signal control means and in response changing from a first state, in which it permits transmission of all message signals, to a second state, in which it blocks transmission of all message signals whose service type field contains said second service type; and responding at the SSPs to each call which relates to a service requiring the use of the SCF, by obtaining from the stored list its associated preassigned service type, and by sending to the SCF via the STF a message having a service type field into which the SSP has written the obtained service type.

34. The method of claim 33, wherein the message signal control means changes from the first state, in which the message signal control means permits transmission of all message signals sent from the SSP to the SCF, to the second state, in which the message signal control means blocks transmission of all said message signals whose service type field contains said second service type.

35. A service switching point (SSP) for use in an intelligent communications network comprising a service control function (SCF) comprising a plurality of service control points (SCPs), the SSP:

having a stored list of services which require the use of the SCF, each service being associated with a respective preassigned service type, this being either a first service type indicative of services that may be processed by a partitioned SCP or a second service type indicative of services that must not be processed by a partitioned SCP, and being arranged to respond to each call which relates to a service requiring the use of the SCF, by obtaining from the stored list its associated preassigned service type, and by outputting a message having a service type field into which the SSP has written the obtained service type.

36. A signalling transfer point (STP) for use in an intelligent communications network comprising a plurality of service switching points (SSPs), and a service control function (SCF); the STP being integral with a message signal controller arranged to respond to receipt of a particular fault signal from the SCF by changing from a first state, in which transmission of message signals from the SSPs to the SCF is unconditional, to a second state, in which transmission of message signals from the SSPs to the SCF is conditional upon a service type field of message signals received from the SSPs containing a particular service type corresponding to services whose message signals may be processed by an SCF having that particular fault.

* * * * *